July 8, 1952   R. B. BELL   2,602,430
FLUID MOTOR MECHANISM FOR WINDSHIELD WIPER SYSTEMS
Filed Aug. 13, 1945   3 Sheets-Sheet 3
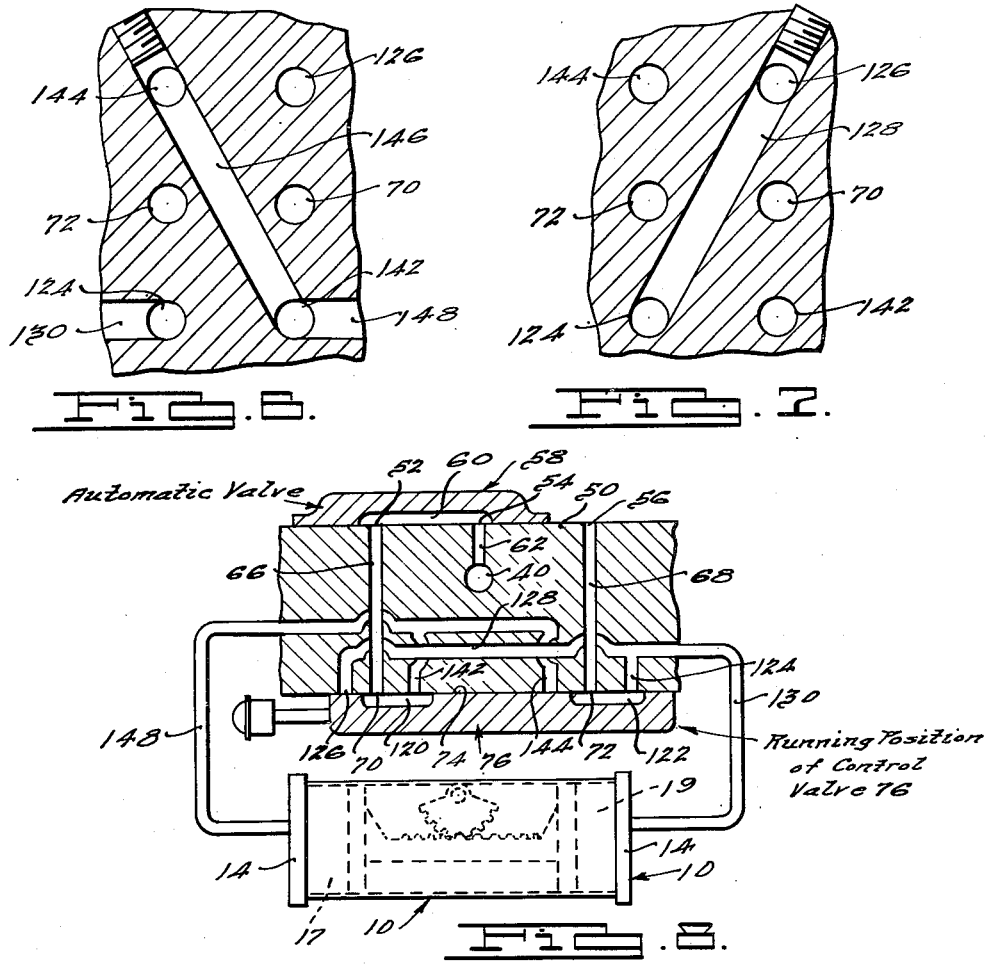
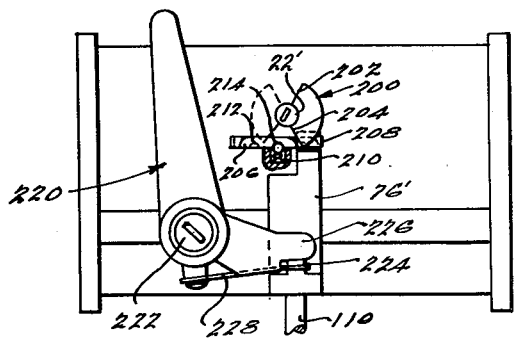
INVENTOR.
Rupert B. Bell.
BY
Harness, Dickey & Pierce
ATTORNEYS.

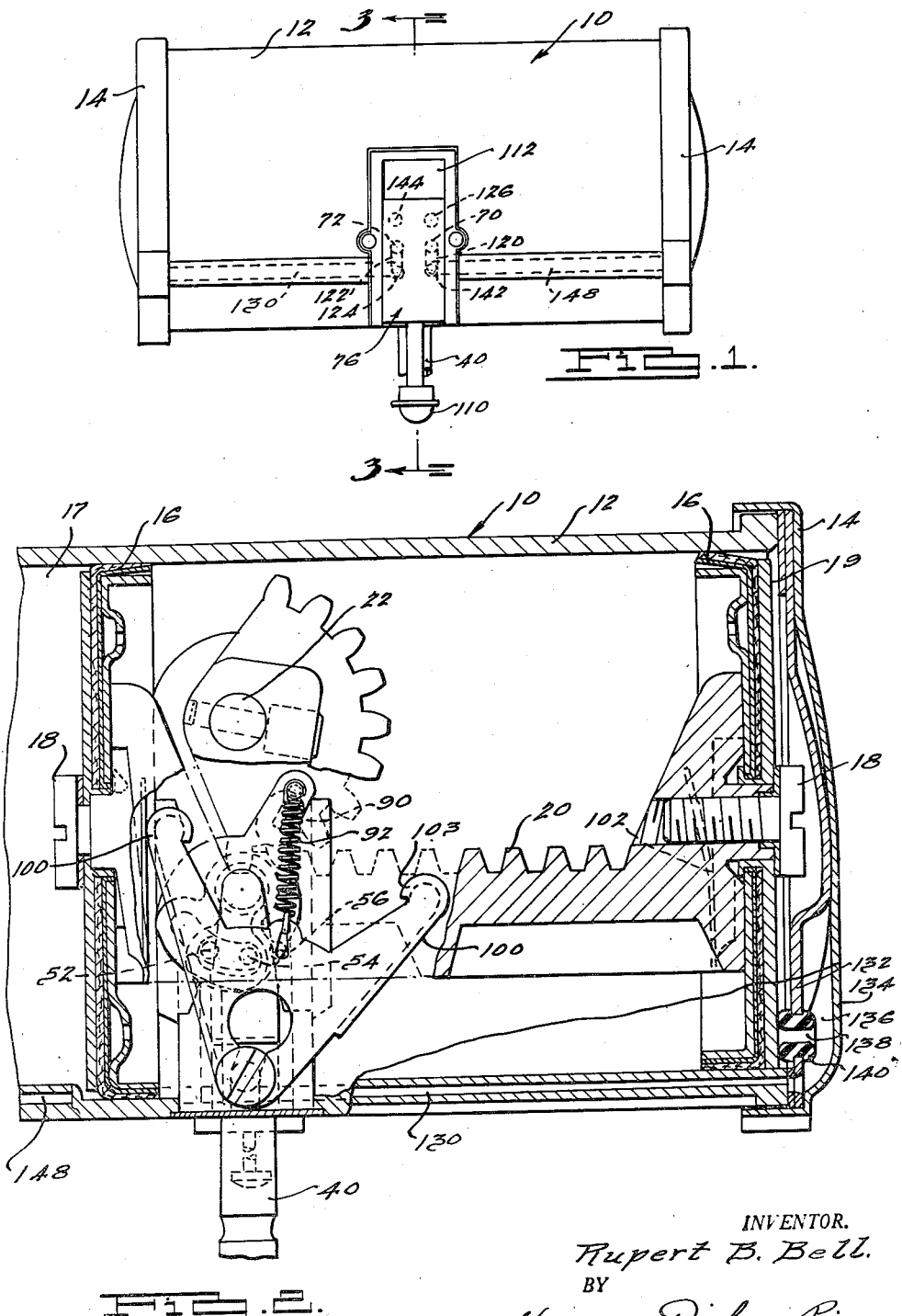

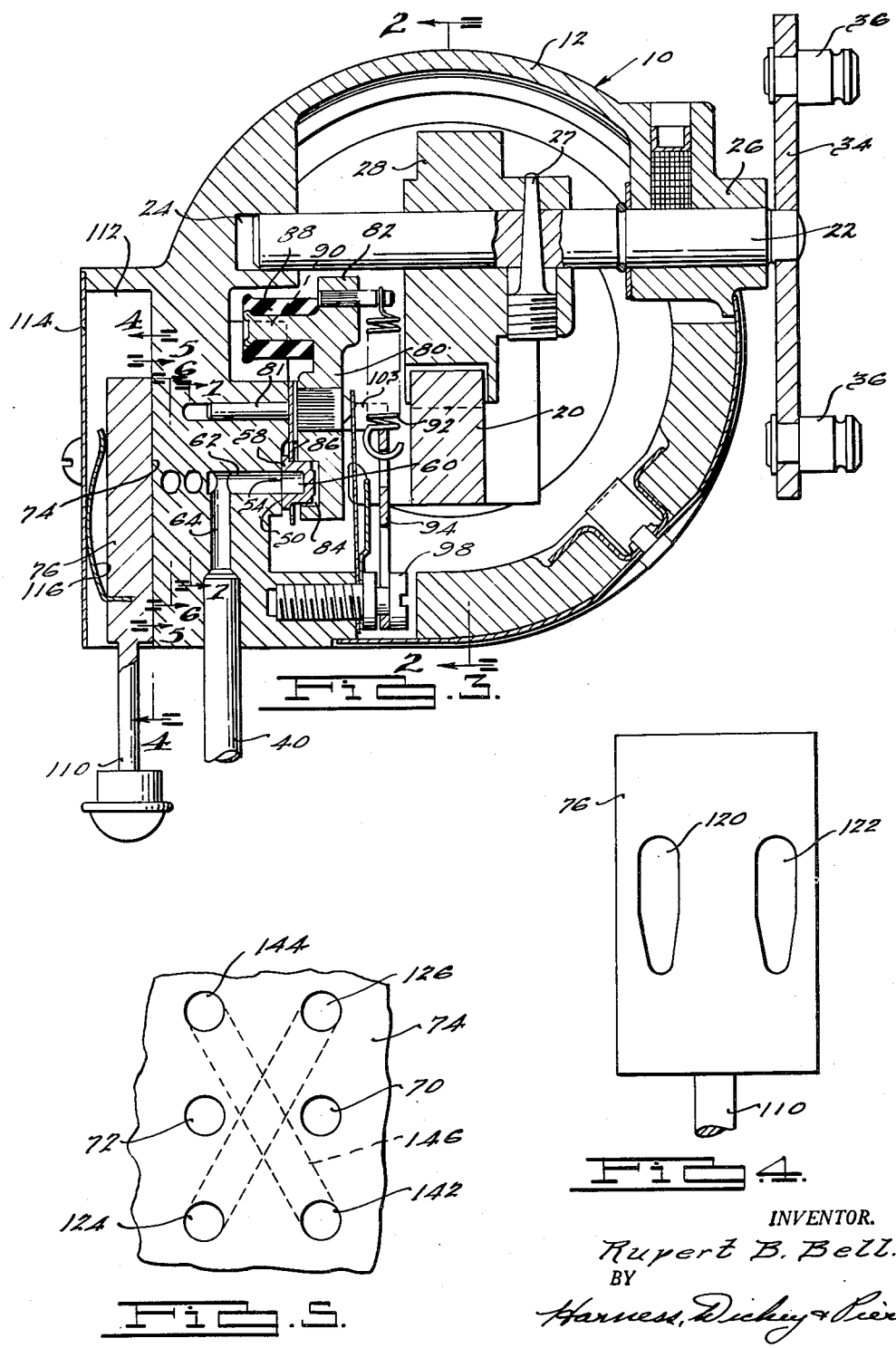

Patented July 8, 1952

2,602,430

UNITED STATES PATENT OFFICE 2,602,430

FLUID MOTOR MECHANISM FOR WINDSHIELD WIPER SYSTEMS

Rupert B. Bell, Ann Arbor, Mich., assignor to King-Seeley Corporation, Ann Arbor, Mich., a corporation of Michigan Application August 13, 1945, Serial No. 610,556

8 Claims. (Cl. 121—164)

The present invention relates to fluid motor mechanisms, and in particular provides such motor mechanisms embodying improved means for causing the movable elements of the motors to move to and stop at terminal positions which may be at a desired distance beyond the normal operating limits of the motors. An illustrative application of the present motor mechanisms is in connection with the automotive windshield wiper systems.

Principal objects of the present invention are to provide fluid motor mechanisms, of the above generally indicated type, which are simple in arrangement, economical of manufacture and assembly, and which are reliable and efficient in operation; to provide such constructions of the reciprocating type, employing automatically operated reversing valve mechanism, and further employing parking control valve mechanism which, generically, serves to reverse the action of the reversing valve mechanism; to provide such constructions in which the motor is connected to its source of power through a pair of serially connected valves of the four-way type, one of such valves being automatically operated in response to the travel of the motor, and the other valve being manually controllable at random; to provide such constructions wherein, in one form, the manually controlled valve can be operated at any time, regardless of the direction of travel of the motor, and in which, in another form, the manually controlled valve can be operated only when the motor is traveling in a particular direction; and to generally improve and simplify the construction and arrangement of fluid motor mechanisms of the above generally indicated type.

With the above as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

Figure 1 is a view in elevation of a fluid motor embodying the invention;

Figure 2 is a fragmentary view in longitudinal central section, taken along the line 2—2 of Figure 3;

Figure 3 is a view in vertical transverse section, taken along the line 3—3 of Figure 1;

Figure 4 is a view in elevation of the control valve, taken along the line 4—4 of Figure 3;

Figures 5, 6, and 7 are fragmentary views, taken, respectively, along the lines 5—5, 6—6, and 7—7 of Figure 3;

Figure 8 is a diagrammatic view illustrating the operation of the embodiment of Figures 1 through 7; and Figure 9 is a view in elevation of a modification of the invention.

It will be appreciated from a complete understanding of the present invention that, in their broader aspects, the improvements thereof may be embodied in fluid motor mechanisms of widely differing types and sizes and designed for widely differing applications. In an illustrative but not in a limiting sense, the present improvements are herein disclosed as being embodied in a fluid motor of the double piston type, an example of which is disclosed and claimed in Patent No. 2,354,189, granted to the present applicant on July 25, 1944. By way of example, such motors are well adapted for use in automotive windshield wiper systems.

Referring to the drawings, the improved motor 10 comprises generally a cylindrical housing or cylinder 12, which is provided with removable end closures 14. Cylinder 12 slidably receives a piston assembly, comprising a pair of spaced pistons 16, which are rigidly secured, as by studs 18, to a connecting rack 20. The output shaft 22 of the motor, which is rotatably journaled in bearings 24 and 26 provided therefor in the cylinder 12, has fixed thereon, as by a pin 27, a gear segment 28, which continuously meshes with the rack 20. Accordingly, reciprocating movements of the piston assembly are translated into oscillatory or rocking movements of the shaft 22. In the illustrated embodiment, shaft 22 is provided with a crank 34, having trunnions 36, which adapt it for connection to the mechanism to be operated by the motor.

It will be appreciated that the piston movements are effected by applying differential pressures in the chamber spaces 17 and 19 between the pistons 16 and the corresponding end closures 14, the space between the pistons 16 being continuously vented to atmosphere in the illustrated instances. These differential pressures may, of course, be obtained from any suitable source. For example, in utilizing the present motor to drive a windshield wiper system, the pressure differential may be the difference between atmospheric pressure and sub-atmospheric pressure obtained in usual fashion by connecting the motor inlet 40 to the intake manifold of the associated engine.

In accordance with the present invention, the motor 10 is provided with a pair of valve mechanisms, having four-way characteristics, and which are serially connected between the motor chambers and the source of differential pressure. One of these valve mechanisms is of the automatically operated type, which responds to the arrival of the pistons at normal limits, so as to reverse the applied fluid pressure differential. The other valve mechanism is manually controlled, and when operated, serves to reverse the fluid connections as established by the automatic valve mechanism. Such a reversal causes the motor to immediately reverse its direction, and proceed to and stop at a terminal position which may be at any desired distance beyond a corresponding normal limit. In one form of the invention, the manual valve may be operated independently of the direction of travel of the motor and consequently is effective to cause the motor to stop at either of two opposite terminal positions, depending upon the direction of travel of the motor at the time the valve is operated. In another form, means are associated with the manual valve so as to render it ineffective except when the motor is traveling in a particular direction. In this form, the motor always comes to rest at the same terminal position.

Any of a variety of automatic valve mechanisms may be utilized. The illustrated valve mechanism embodies the invention of the aforesaid Patent No. 2,354,189. More particularly, the automatic valve mechanism comprises a valve seat 50, provided with a series of three arcuately distributed ports 52, 54, and 56. A usual hood valve 58, having a single blind pocket 60 therein, is disposed for movement between the position illustrated in Figure 2, in which it bridges ports 52 and 54, and exposes port 56, to a position in which it bridges ports 54 and 56 and exposes port 52. The exposed port opens into the space between the piston 16, which, as previously mentioned, is continuously vented to atmosphere. The central port 54 communicates through interconnecting passages 62 and 64, with the suction line 40. The side ports, or chamber ports, 52 and 56, communicate, through passages 66 and 68, with corresponding ports 70 and 72, which open through the face 74 of the control valve seat, associated with the manually operable control valve 76.

Hood valve 58 is carried by a valve actuator or kicker 80 which is pivotally mounted on a trunnion 81, and which is provided with an upwardly directed arm 82. The lower portion of kicker 80 is enlarged and is provided with an arcuate slot 84 which receives, and is somewhat longer than, the valve 58. A spring 86, carried by trunnion 81, bears against the back of valve 58 to hold it on its seat.

The upper end of arm 80 carries a rubber buffer 88, which cooperates with spaced stop shoulders 90 on the valve block to limit the throw of the kicker.

Kicker 80 is connected, by a tension spring 92, to a pivoted spring carrier 94. Spring carrier 94 is pivotally supported by means of a pin 98, and is provided with spaced arms 100 which are disposed to be engaged and moved by abutments 102 carried by the rack 20.

It will be appreciated that as the piston assembly moves to the left as viewed in Figure 2, the right-hand, piston-carried, abutment 102 ultimately engages the right-hand arm 100 of the spring carrier 94, initiating a swinging movement thereof which ultimately carries the lower end of the spring 92 past an over-center position. Such carrier movement also causes the upper and laterally turned end 103 of the arm 100 to engage and positively move the upper end of the kicker 80, initiating a snap-over movement of the latter. During the course of this snap-over movement, the end of slot 84 engages the valve 58 and snaps it to its opposite position. During rightward piston movement, a reverse action takes place resulting in snapping the valve 58 to the operating position shown in Figure 2. Both right-hand and left-hand valve actions occur at normal limits of the piston movement. The motor is shown in Figure 2 at a stopping position in which the right-hand piston 16 is immediately adjacent its corresponding cylinder closure 14, which position is beyond the normal right-hand limit of travel of the motor, as established by the automatic reversing valve mechanism. Such over travel is caused, as described below, by the action of the manual control valve 76, and is accommodated by the automatic reversing valve, since during the over travel, the spring carrier 94 is simply pivoted, by the abutment 102, to a point beyond the point at which the snap action of kicker 80 takes place.

The manual valve 76 is illustrated as being of the slidable type, and is provided with an operating button 110. Valve 76 is received and guided in a recess 112 formed in the body of the cylinder, and the base of which constitutes the previously mentioned control valve seat 74. Recess 112 is provided with a removable cover 114, and a spring 116, carried by valve 76, cooperates with the cover to yieldingly hold valve 76 on its seat.

As shown in Figure 4, valve 76 is provided with a pair of elongated blind pockets 120 and 122, which cooperate with the hereinafter described ports which open through the face of seat 74. The lower ends of pockets 120 and 122 are narrowed, so as to provide for varying the speed of motor 10.

In addition to the previously identified ports and passages, the valve block is provided with passages 124 and 126 which open through the control valve seat 74. Passages 124—126 continuously communicate with each other through a lateral passage 128, and also continuously communicate with a chamber passage 130 which leads to the right-hand chamber space 19 through the corresponding closure 14, as viewed in Figure 2. Such closure is formed of two stampings 132 and 134, which, throughout a portion of the circumference thereof, are spaced apart to define an auxiliary chamber 136. Chamber 136 communicates through a passage 138, with the chamber space 19 between the right-hand piston 16 and the end closure 14, passage 138 being defined by a rubber grommet 140, against which the right-hand piston seats when the motor is at its indicated right-hand terminal position. Such seating closes off the just-mentioned passage 138.

Similarly, a pair of passages 142 and 144 open through the face of seat 74. These passages continuously communicate with each other through an angled passage 146, and also continuously communicate with a cylinder passage 148, which leads to the chamber space 17 between the left-hand piston 16 and its closure 14, in the manner described in connection with the right-hand end closure 14.

In the running position of the control valve 76, pocket 120 bridges ports 70 and 142, and pocket 122 bridges ports 72 and 124, ports 126 and 144 being closed off by the body of the valve. In the stopping position, pocket 120 bridges ports 70 and 126, and pocket 122 bridges ports 72 and 144, ports 124 and 142 being closed off by the body of the valve. The running position is shown in Figure 1, and it will be appreciated that, as valve 76 is moved from the running position toward the parking position, the effective size of ports 124 and 142 is first reduced, by the narrowed lower ends of pockets 122 and 120, thereby reducing the speed of the motor. As the movement of control valve 76 is continued, toward the stopping position, ports 124 and 142 are first closed off by the body of the control valve, and thereafter pockets 120 and 122 bridge, respectively, ports 70—126 and ports 72—144. In such parking position, the control valve establishes connections for the motor which are the reverse of those which would normally be established by the then existing position of the automatic reversing valve. Consequently, movement of the control valve to the parking position causes the motor to immediately stop, and re-start in the opposite direction. Continued movement in the opposite direction causes the motor to approach the normal reversing point, which it just left. Such approach does not cause a throw-over action of the reversing valve, since such reversing valve is already in the position to which it is normally moved by the arrival of the motor at such normal limit. Consequently, no reversing action takes place at the normal limit and the motor continues in such opposite direction until it is stopped by the engagement of the leading piston 16, with the corresponding grommet 140. Such engagement, in addition to resiliently bringing the motor to rest, also closes off the corresponding suction passage 136.

It is believed that the just described reversing operations may best be understood with reference to the diagrammatic view of Figure 8.

In this figure, the automatic reversing valve 58 is shown as occupying the same position as in Figure 2, and the control valve 76 is illustrated as occupying the running position shown in Figure 1. The motor 10 is diagrammatically shown as being viewed in the same direction as in Figure 2, so that leftward piston movement in Figure 8 corresponds to leftward piston movement in Figure 2 and vice versa.

With the reversing and control valves in the indicated positions, Figure 8, it will be appreciated that the left-hand piston chamber 17, is connected to the suction line 40, the circuit being as follows: line 40, passage 62, reversing valve pocket 60, passage 66, control valve pocket 120, and passages 142 and 148 into the piston chamber 17. At the same time, chamber 19 is connected to atmosphere through passages 130 and 124, control valve pocket 122, and passage 68, which, as previously described, opens through the face of the reversing valve seat at port 56. From previous description, it will be appreciated that when the piston assembly reaches its normal left-hand limit of travel, valve 58 moves to the opposite position, exposing port 52 and connecting ports 54 and 56 together. This action connects chamber 17 to atmosphere through passages 148 and 142, pocket 120, and passage 66; and connects chamber 19 to the suction line through passage 62, pocket 60, passage 68, pocket 122, and passages 124 and 130. When the normal right-hand limit of travel is reached by the piston assembly, valve 58 is again snapped to the position shown in Figure 8.

It is believed to be clear also that if control valve 76 is moved from the running position of Figure 8 to the parked position, connections established by the then existing position of the reversing valve are reversed, causing the motor to stop and re-start in the opposite direction. More particularly, assuming the reversing valve is is the position of Figure 8, and the control valve is moved to the left, to the parking position, such action causes pocket 120 to bridge ports 70 and 126, and causes pocket 122 to bridge ports 72 and 144. Under these conditions, ports 124 and 142 are closed off by the body of the control valve. Under the just-mentioned conditions, chamber 19 is connected to suction through a circuit which extends from the suction line 40 through passage 62, pocket 60, passage 66, pocket 120, passages 126 and 130 into chamber 19. At the same time chamber 17 is connected to atmosphere through passages 144 and 148, pocket 122, and passage 68. Accordingly, even though the reversing valve is in a position to normally cause leftward travel of the motor, the control valve establishes connections which cause rightward travel thereof. When the piston assembly reaches its normal right-hand limit position, no throw-over action of valve 58 results, since it is already in the position to which the arrival of the motor at its right-hand limit is effective to move it. Such arrival at the right-hand limit accordingly does not alter the fluid circuits then in effect, and the motor continues on past the right-hand limit. When the motor reaches the position shown in Figure 2, it is brought to a cushioned stop by the engagement of the piston with grommet 140. Such engagement also closes off passage 138. It will be understood that piston 16 is maintained in engagement with grommet 138 by a suction effect, due to the sub-atmospheric pressure in line 130.

On the other hand, if control valve 76 is moved to the parking position during rightward travel of the motor, a reversal of the effective connections is produced which causes the motor to stop, re-start in the opposite direction, and move to and come to rest at the left-hand limit. The stop at the left-hand limit is accomplished in the manner described above.

In certain instances, as, for example, in connection with windshield wiper apparatus, it may be desired to always bring the motor to rest at the same terminal position, either its right-hand terminal or its left-hand terminal. This, of course, may be accomplished manually by operating the control valve only when the motor is moving in a particular direction. In accordance with the present invention, this selective control may be effected by arranging the control valve so that it cannot be moved to the stop position except when the motor is moving in the desired direction.

Referring particularly to Figure 9, the motor shaft 22' is extended through to the back of the motor, and carries a cam 200 which is fixed relative to the shaft. Cam 200 is provided with two spaced cam shoulders 202 and 204, which co-operate with a blocking member 206, which is slidably guided for back-and-forth movement, in a groove 208, formed in the motor casing. A usual detent 210, also carried by the motor casing, co-operates with the blocking member 206, to yieldably hold it in either its left-hand, full-line position, or its right-hand, dotted position. It will be appreciated that as the piston assembly moves to the left, as viewed in Figure 9, cam 200 is rocked in a clockwise direction and vice versa. Thus, as the piston assembly reaches its normal left-hand limit of travel, as viewed in Figure 9, cam shoulder 204 engages the right-hand end of blocking member 206 and pushes it to the left far enough to enable the detent 210 to pass over the shoulder which separates the two detent pockets 212 and 214, whereupon the detent 210 is enabled to carry member 206 to the left-hand position shown in full lines. When the piston assembly reaches the normal right-hand limit of travel on the other hand, cam shoulder 202 engages blocking member 206, and causes it to be moved to its right-hand or dotted line position.

In the full-line position, blocking member 206 does not interfere with movement of the control valve 76' to the stopping position, in which the reduced end portion 216 thereof lies below a portion of cam 200. In its right-hand or blocking position on the other hand, member 206 lies in the path of valve 76' and prevents movement of the latter to the stopping position.

From the foregoing, it will be appreciated that member 206 lies in blocking relation to control valve 76' so long as the piston assembly is moving to the left as viewed in Figure 9, and is out of blocking relation so long as the piston assembly is moving to the right as viewed in Figure 9. Accordingly, control valve 76 can be moved to the shut off position only while the piston assembly is moving to the right, which action from previous description, will be recalled as causing an immediate reversal of the piston movement, and will result in stopping the motor at its left-hand parking position (Figure 9).

In accordance with the arrangement described in greater detail in the aforesaid Patent No. 2,354,189, control valve 76' is provided with an actuating lever 220, which is pivoted to the motor cylinder at 222. Valve 76' is provided with an upturned member 224, which lies between the arm 226 of lever 220, and a leaf spring 228 which is carried by the lever 220. With this relation, it will be appreciated that a clockwise movement of lever 220 is effective to positively move valve 76' away from the cam 200, to the running position of, for example, Figure 1. On the other hand, a counter-clockwise movement of lever 220 is effective to move valve 76' only by virtue of the biasing effect of spring 228, and only to the extent permitted by the blocking member 206. Such movement of the control lever 220 does, however, load spring 228 and enable it to urge valve 76' to the stopping position. Thus, if the movement of lever 220 takes place while the motor is moving to the left, Figure 9, such lever movement serves only to load the spring 228. As soon as the motor reaches its left-hand limit, however, blocking member 206 is snapped out of blocking relation to valve 76', enabling the latter to reverse the operating connections for the motor and to cause it to continue to and stop at the left-hand parking position. If the movement of lever 220 takes place while the piston assembly is moving to the right, Figure 9, such movement causes a corresponding movement of valve 76' which thereupon functions to immediately reverse the motor connections and cause the piston assembly to travel to and stop at the left-hand parking position. It will be noticed that as the motor travels to the left beyond its normal left-hand limit, a further movement of blocking member 206, to the left of its full line position, may be occasioned. This additional movement is permitted by the guide slot 208 which receives member 206.

Although only several embodiments of the invention have been described in detail, it will be appreciated that various further modifications in the form, number, and arrangement of the parts may be made without departing from the spirit and scope of the invention.

What is claimed is:

1. In a fluid motor, first and second members movable relative to each other back and forth between normal limits under the influence of a reversibly applied differential between higher and lower fluid pressures, a supply passage adapted for connection to a source of one of said pressures, and valve mechanism interposed between said passage and said motor, said valve mechanism including reversing valve means having means defining passage means for connecting said supply passage to said motor and being automatically operable at said limits to reverse said connection, and control valve means operable at random, independently of the direction of said relative motor movement, to reverse the connection through said reversing valve passage means, of said supply passage to said motor.

2. The structure of claim 1 wherein said reversing valve means includes an element which is movable back and forth between first and second positions in reversing the connection of said supply passage to said motor, said element being movable only from the first position to the second position at one said limit and only from the second position to the first position at the other limit, so that a said operation of said control valve means independently of the position of said reversing valve means causes the said relative motor movement to reverse and continue without reversal past the normal limit next encountered after a said operation.

3. In a fluid motor, first and second members movable relative to each other back and forth between normal limits under the influence of a reversibly applied differential between higher and lower fluid pressures, a supply passage adapted for connection to a source of one of said pressures, and valve mechanism interposed between said passage and said motor, said valve mechanism including reversing valve means having means defining passage means for connecting said supply passage to said motor and being automatically operable at said limits to reverse said connection, and means for causing the said relative motor movement to continue beyond either of said normal limits, including control valve means operable independently of the position of said reversing valve to reverse the connection, through said reversing valve passage means of said supply passage to said motor.

4. In a fluid motor, first and second members movable relative to each other back and forth between normal limits under the influence of a reversibly applied differential between higher and lower fluid pressures, a supply passage adapted for connection to a source of one of said pressures, and valve mechanism interposed between said passage and said motor, said valve mechanism including reversing valve means having means defining passage means for connecting said supply passage to said motor and being automatically operable at said limits to reverse said connection, and means for causing the said relative motor movement to continue beyond either of said normal limits, including control valve means operable to reverse the connection, through said reversing valve passage means, of said supply passage to said motor.

5. In a fluid motor, first and second members movable relative to each other back and forth between normal limits under the influence of reversibly applied differential fluid pressures, and a pair of serially connected valve means interposed between said motor and a source of pressure, each said valve means having the characteristics of a four-way valve and each being selectively effective to connect either one of a pair of sources of said differential fluid pressures to either one of a pair of chamber spaces, all the connections of each of said sources of said pressures to said spaces including in series a passage controlled by one of said valve means and a passage controlled by the other of said valve means, one of said valve means being automatically operated at said normal limits, and the other said valve means being manually operable.

6. The structure of claim 5 wherein said manual valve means is operable only during a said relative motor movement in one direction.

7. The structure of claim 5 wherein said manual valve means is operable at random, independently of the direction of said relative motor movement.

8. In a fluid motor, first and second members movable relative to each other back and forth between normal limits under the influence of reversibly applied differential fluid pressures, and valve means for normally causing a said relative movement between said limits and being operable to cause a said relative movement to continue beyond one of said normal limits, said valve means including a pair of serially connected valves each having the characteristics of a four-way valve and each being selectively effective to connect either one of a pair of sources of said differential fluid pressures to either one of a pair of chamber spaces, all the connections of each of said sources of said pressures to said spaces including in series a passage controlled by one of said valve means and a passage controlled by the other of said valve means, one of said valve means being automatically operated at said normal limits and the other of said valves being manually operable.

RUPERT B. BELL.

REFERENCES CITED

The following references are of record in the file of this patent:

UNITED STATES PATENTS

| Number | Name | Date |
|---|---|---|
| 1,840,233 | Hueber | Jan. 5, 1932 |
| 2,218,719 | Richards | Oct. 22, 1940 |
| 2,310,750 | Schnell | Feb. 9, 1943 |
| 2,354,189 | Bell | July 25, 1944 |

FOREIGN PATENTS

| Number | Country | Date |
|---|---|---|
| 473,296 | Great Britain | Oct. 11, 1937 |
| 697,976 | France | Nov. 5, 1930 |